(12) United States Patent
Li

(10) Patent No.: US 11,538,046 B2
(45) Date of Patent: Dec. 27, 2022

(54) PAGE DATA ACQUISITION METHOD, APPARATUS, SERVER, ELECTRONIC DEVICE AND COMPUTER READABLE MEDIUM

(71) Applicant: BOE TECHNOLOGY GROUP CO., LTD., Beijing (CN)

(72) Inventor: Yingjie Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 398 days.

(21) Appl. No.: 16/474,478

(22) PCT Filed: Dec. 20, 2018

(86) PCT No.: PCT/CN2018/122297
§ 371 (c)(1),
(2) Date: Jun. 27, 2019

(87) PCT Pub. No.: WO2019/196498
PCT Pub. Date: Oct. 17, 2019

(65) Prior Publication Data
US 2020/0357007 A1    Nov. 12, 2020

(30) Foreign Application Priority Data

Apr. 12, 2018 (CN) ............................ 201810328622

(51) Int. Cl.
*G06Q 30/02* (2012.01)
*G06F 16/958* (2019.01)
(Continued)

(52) U.S. Cl.
CPC ....... *G06Q 30/0201* (2013.01); *G06F 11/302* (2013.01); *G06F 11/3438* (2013.01); *G06F 16/958* (2019.01); *H04L 67/535* (2022.05)

(58) Field of Classification Search
CPC .................................................. G06Q 30/0201
See application file for complete search history.

(56) References Cited

U.S. PATENT DOCUMENTS

| 10,234,953 B1* | 3/2019 | Li ...................... G06F 3/04883 |
| 2006/0095912 A1* | 5/2006 | Wood-Gaines ..... G06F 11/3495 718/100 |

(Continued)

FOREIGN PATENT DOCUMENTS

| CN | 104346276 A | 2/2015 |
| CN | 106598868 A | 4/2017 |

(Continued)

OTHER PUBLICATIONS

Xu Bo etal, P2P Flows Identification Method Based on Listening Port, 2009 2nd IEEE International Conference on Broadband Network & Multimedia Technology (Year: 2009).*

(Continued)

*Primary Examiner* — Andre D Boyce
(74) *Attorney, Agent, or Firm* — Myers Bigel, P.A.

(57) ABSTRACT

Embodiments of the disclosure provide a page data acquisition method, apparatus, a server, an electronic device and a computer readable medium, and relate to the field of computer technology. The page data acquisition method includes communicating with a server, and obtaining configuration information from the server. Configuration information includes control information. The page data acquisition method includes traversing the controls in a current page, and for each of the controls, judging whether the control is one indicated by the control information in the configuration information, setting a listener for the control in response to the control being one indicated by the control information in the configuration information, and performing behavior data acquisition on the control by the listener.

15 Claims, 8 Drawing Sheets

(51) Int. Cl.
  *G06F 11/30*   (2006.01)
  *G06F 11/34*   (2006.01)
  *H04L 67/50*   (2022.01)

(56) References Cited

U.S. PATENT DOCUMENTS

| | | | |
|---|---|---|---|
| 2006/0184410 A1* | 8/2006 | Ramamurthy | G06Q 10/10 |
| | | | 706/8 |
| 2009/0172568 A1* | 7/2009 | Arthursson | H04L 67/02 |
| | | | 715/762 |
| 2010/0125657 A1 | 5/2010 | Dowling et al. | |
| 2017/0272316 A1* | 9/2017 | Johnson | G06Q 10/103 |
| 2017/0329390 A1* | 11/2017 | Shah | G06F 9/4418 |

FOREIGN PATENT DOCUMENTS

| | | | |
|---|---|---|---|
| CN | 106776247 A | 5/2017 | |
| CN | 106933472 A | 7/2017 | |
| CN | 107491488 A | 12/2017 | |
| CN | 107864065 A | 3/2018 | |

OTHER PUBLICATIONS

International Search Report and Written Opinion of the International Searching Authority (with English language translation), International Application No. PCT/CN2018/122297, dated Mar. 21, 2019, 12 pp.

First Office Action and English language translation, CN Application No. 201810328622.5, dated Feb. 6, 2020, 19 pp.

\* cited by examiner

US 11,538,046 B2

PAGE DATA ACQUISITION METHOD, APPARATUS, SERVER, ELECTRONIC DEVICE AND COMPUTER READABLE MEDIUM

CROSS REFERENCE TO RELATED APPLICATIONS

The present application is a 35 U.S.C. 371 national stage application of PCT International Application No. PCT/CN2018/122297, filed on Dec. 20, 2018, which claims the benefit of Chinese Patent Application No. 201810328622.5, filed on Apr. 12, 2018, the entire disclosures of which are incorporated herein by reference.

TECHNICAL FIELD

The disclosure relates to the field of computer technology, and in particular, to a page data acquisition method, apparatus, a server, an electronic device and a computer readable medium.

BACKGROUND

With the rapid development of mobile internet technologies, users will use various applications (APPs), a developer or company of an APP often wants to collect and analyze the user usage data of the developed APP, and may better learn about behaviors of the users and feedback on the product, so as to further optimize and upgrade the APP and subsequent services, or give users better recommendations, or the like.

SUMMARY

In a first aspect, there is provided a page data acquisition method including: communicating with a server, and obtaining configuration information from the server, which configuration information includes control information; traversing all the controls in a current page, and for each of the controls, judging whether the control is one indicated by the control information in the configuration information; setting a listener for the control in response to the control being one indicated by the control information in the configuration information; and performing behavior data acquisition on the control by the listener.

In an embodiment, after it is judged that the control is one indicated by the control information in the configuration information, before setting a listener for the control, the method further includes: finding whether there is a record for the control.

In an embodiment, the method further includes: in response to determining that there is no record for the control, recording the control; determining whether there is an existing listener for the control; and in response to determining that there is an existing listener for the control, replacing the existing listener with a new listener, wherein the new listener is added a behavior data acquisition function corresponding to the type of the control on the existing listener; and in response to determining that there is no listener for the control, setting a listener for the control.

In an embodiment, the method further includes: in response to determining that there is a record for the control, continuing to use the existing listener.

In an embodiment, the configuration information further includes page information, and the method further includes: obtaining the duration from entering to exiting the current page and a page name.

In a further embodiment, the obtaining the duration from entering to exiting the current page and a page name includes: obtaining the time to enter the current page and the page name; wherein the obtaining the time to enter the current page and the page name particularly includes: in response to entering the current page, recording the time to enter the current page, identifying the state of the current page as visible, and storing page information including a page object and the page name of the current page; and when storing the page information, judging whether there is a main window page with a visible state in a current storage list; and in response to there being a main window page with a visible state, taking the current page as a sub-window page of the main window page with a visible state; and in response to there being no main window page with a visible state, taking the current page as a main window page.

On this basis, after obtaining the time to enter the current page and the page name, the duration from entering to exiting the current page is obtained, wherein the method further includes: judging whether the current page is a sub-window page when the current page exits; in response to the current page being a sub-window page, taking the current time minus the time to enter the current page as the duration from entering to exiting the current page, and identifying the state of the current page as invisible; and in response to the current page being not a sub-window page, for the current page and a sub-window page which is affiliated to the current page and of which the state is identified as visible, employing the current time minus the respective time of entry as the durations from entering to exiting the respective pages, and identifying the states of the current page and the sub-window page which is affiliated to the current page and of which the state is identified as visible as invisible.

In an embodiment, the listener is set for the control by means of reflection and dynamic proxy.

In an embodiment, after obtaining the configuration information from the server, before traversing all the controls in the current page, the method further includes: parsing the configuration information and storing it locally.

In an embodiment, the control information includes a control ID and an associated control ID.

In an embodiment, the method further includes: uploading at least the acquired behavior data to the server.

In a second aspect, there is provided a page data acquisition apparatus including: a communicator configured to communicate with a server, and obtain configuration information from the server, which configuration information includes control information; and a control event monitor configured to traverse all the controls in a current page, and for each of the controls, judge whether the control is one indicated by the control information in the configuration information, set a listener for the control in response to the control being one indicated by the control information in the configuration information, and perform behavior data acquisition on the control by the listener.

In an embodiment, the control event monitor is configured to, after judging that the control is one indicated by the control information in the configuration information, before setting a listener for the control, further find whether there is a record for the control.

In an embodiment, the control event monitor is further configured to, in response to determining that there is no record for the control, record the control; determine whether there is an existing listener for the control; and in response to determining that there is an existing listener for the control, replace the existing listener with a new listener, wherein the new listener is added a behavior data acquisition function corresponding to the type of the control on the existing listener; and in response to determining that there is no listener for the control, set a listener for the control.

In an embodiment, the control event monitor is further configured to, in response to determining that there is a record for the control, continue to use the existing listener.

In an embodiment, the configuration information further includes page information, and based on this, the page data acquisition apparatus further includes a page statistics device configured to obtain the duration from entering to exiting the current page and a page name.

Further, the page statistics device obtaining the duration from entering to exiting the current page and a page name includes: the page statistics device obtaining the time to enter the current page and the page name; wherein the page statistics device obtaining the time to enter the current page and the page name includes: in response to entering the current page, recording the time to enter the current page, identifying the state of the current page as visible, and storing page information including a page object and the page name of the current page; and when storing the page information, judging whether there is a main window page with a visible state in a current storage list; and in response to there being a main window page with a visible state, taking the current page as a sub-window page of the main window page with a visible state; and in response to there being no main window page with a visible state, taking the current page as a main window page.

On this basis, after obtaining the time to enter the current page and the page name, the page statistics device further obtains the duration from entering to exiting the current page, wherein the page statistics device obtaining the duration from entering to exiting the current page includes: judging whether the current page is a sub-window page when the current page exits; in response to the current page being a sub-window page, taking the current time minus the time to enter the current page as the duration from entering to exiting the current page, and identifying the state of the current page as invisible; and in response to the current page being not a sub-window page, for the current page and a sub-window page which is affiliated to the current page and of which the state is identified as visible, employing the current time minus the respective time of entry as the durations from entering to exiting the respective pages, and identifying the states of the current page and the sub-window page which is affiliated to the current page and of which the state is identified as visible as invisible.

In an embodiment, the page data acquisition apparatus further includes a parser configured to parse the configuration information obtained from the server and store it locally.

In an embodiment, the communicator is further configured to upload at least the acquired behavior data to the server.

In a third aspect, there is provided a server including: a configuration memory configured to store configuration information, which configuration information includes control information; a request receiver which sends the configuration information to a page data acquisition apparatus when receiving a request for obtaining the configuration information sent by the page data acquisition apparatus.

In an embodiment, the server further includes a collector configured to store and analyze behavior data uploaded by the page data acquisition apparatus.

In a further embodiment, the configuration information further includes page information, and the collector is further configured to store and analyze the duration from entering to exiting a current page and a page name uploaded by the page data acquisition apparatus.

In a fourth aspect, there is provided an electronic device including a processor and a memory which is used for storing one or more program; and when executed by the processor, the one or more program implements the method as described in the first aspect.

In a fifth aspect, there is provided a computer readable medium storing thereon a computer program which, when executed, implements the method as described in the first aspect.

BRIEF DESCRIPTION OF THE DRAWINGS

In order to more clearly illustrate the technical solutions in embodiments of the disclosure or the reference, the appended drawings needing to be used in description of the embodiments or the reference technology will be introduced simply in the following. Obviously, the drawings in the following description are only some embodiments of the disclosure, and for the person having ordinary skills in the art, other drawings may also be obtained according to these drawings under the premise of not paying out undue experimentation.

DETAILED DESCRIPTION

In the following the technical solutions in embodiments of the disclosure will be described clearly and completely in conjunction with the drawings in the embodiments of the disclosure. Obviously, the described embodiments are just a part of the embodiments of the disclosure, and not all the embodiments. Based on the embodiments in the disclosure, all the other embodiments obtained by the person having ordinary skills in the art under the premise of not paying out undue experimentation pertain to the scope protected by the disclosure.

Nowadays, for data acquisition in an APP (application), it is often needed for a developer to write code specifically for data acquisition and put it in a callback function which generates an event at the time of a specific operation on an interface. This will make the development process complicated, it is needed to consider a control to acquire data and write code in advance, and if the data acquisition points are increased or decreased later, it is necessary to rewrite the code and upgrade software so as to make the new code take effect on the APP, which lacks flexibility. In addition, some technical solutions employ a full buried point manner, that is, add a segment of processing code to all possibly acquired event point callbacks on the interface, and the developer has to take account of embedding of a data acquisition function in advance.

Figure 1:
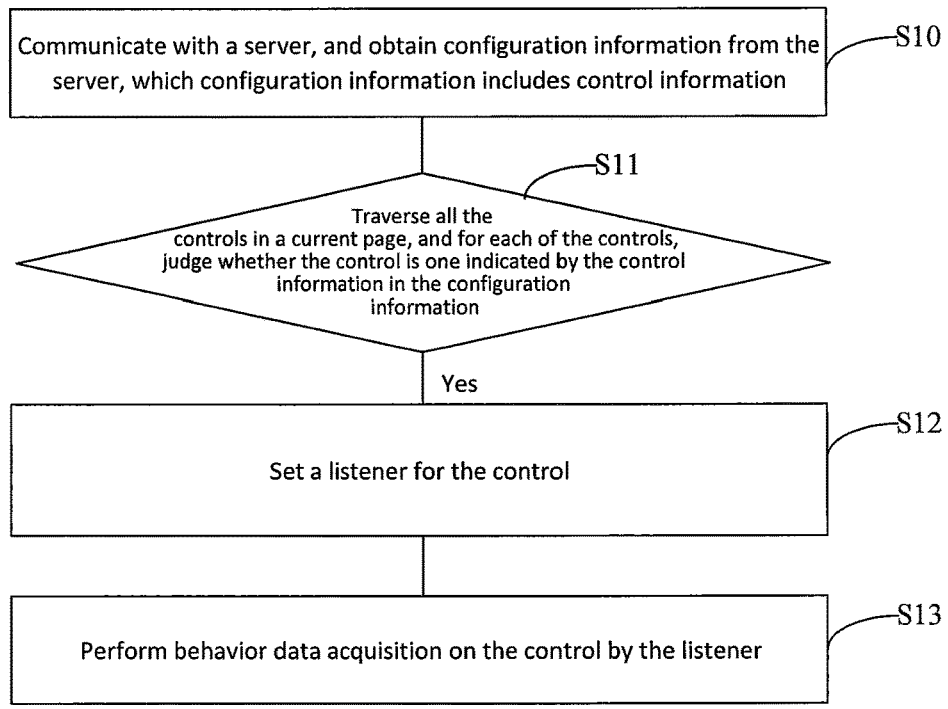
FIG. 1 is a flow diagram 1 of a page data acquisition method provided by the disclosure.

An embodiment of the disclosure provides a page data acquisition method, which, as shown in FIG. 1, includes the following steps.

S10, communication with a server is performed, and configuration information is obtained from the server, which configuration information includes control information.

It will be appreciated by the person having skills in the art that in the embodiment of the disclosure, the page data acquisition method is performed by a terminal device. Various applications may be installed on the terminal device, for example, a shopping class application, a webpage browser application, a search class application, an instant communication tool, a mailbox client, etc. The terminal device includes, but not limited to, a mobile phone, a tablet computer, a portable computer, a desktop computer, etc.

The terminal device may communicate with the server through a wired or wireless network.

S11, all the controls in a current page are traversed, and for each of the controls, it is judged whether the control is one indicated by the control information in the configuration information; and if yes, S12 is performed.

Therein, for the control, there is a text control, a picture control, a button control, a selection box control, an input box control, a progress bar control, etc.

All the controls in the current page may be traversed in a recursive manner.

With Android as an example, traversing all the controls in the current page may be to parse a view tree of the page and traverse all the views starting from DecorView (a root node) in the views. The number of child nodes may be obtained by a function getChildCount( ) then a view of a child node is obtained by a function getChildAt( ) and all the views of the page may be traversed in a recursive manner. Therein, it should be appreciated by the person having skills in the art that the control is a specific class of view. On this basis, if the information of a certain control is consistent with the control information in the configuration information, a listener is set for the control.

It may be understood that the control information included by the configuration information in the server shall be information of a control on which behavior data acquisition needs to be performed.

S12, a listener is set for the control.

It needs to be noted that, if a certain control is one indicated by the control information in the configuration information, a listener is set for the control, which is essentially to create a new listener to replace the existing listener and add in the new listener a behavior data acquisition function corresponding to the type of the control, of which the code will be preset in a program in advance. In addition to acquiring behavior data, the actions with which the new listener responds to an event will invoke an event response function of the original listener to accomplish the original functional logic of the control.

Therein, the behavior data acquisition function should be determined according to the type of the control. For example, for a button control, what is acquired is click behavior data; and for a selection box control, selection behavior data may be acquired, or click behavior data may also be acquired. When multiple kinds of behavior data may be acquired for a control, it is necessary to determine which kind of behavior data is to be acquired at the time of developing the program, and thus preset code knows what type of listener to use to replace the original listener (that is, which behavior data acquisition function is added). Once the acquisition action is defined, the acquisition function will be determined when a behavior takes place.

Since the code of the behavior data acquisition function does not need to be written in each event processing function, the behavior data acquisition is performed in a buried-point-free manner in the disclosure. Here, it further needs to be noted that, it is only necessary to add code at positions where a page shows and disappears when developing an APP in the disclosure. In particular, use of the buried-point-free manner to acquire behavior data needs to invoke an interface, and yet the places where the interface is invoked are the positions where a page shows and disappears.

S13, behavior data acquisition is performed on the control by the listener.

The embodiment of the disclosure provides a page data acquisition method. By storing configuration information including control information in a server, wherein the control indicated by the control information is one on which it is necessary to perform behavior data acquisition, it may be possible to set a listener only for the control indicated in the configuration information, to implement acquisition of behavior data, after a terminal device obtains the configuration information and when a user is browsing a current page. Based on this, since the behavior data acquisition function will be preset in a program in advance, and add it when a listener is set for a control, as compared to the buried point manner (i.e., in which code is written in an event processing function) employed in the reference, the disclosure does not need to add code when each control event is processed, which may reduce the complexity of the development process. When it is needed to update the listener for a control event, it is also no need to rewrite code and update software, and the operation is simple.

Figure 2:
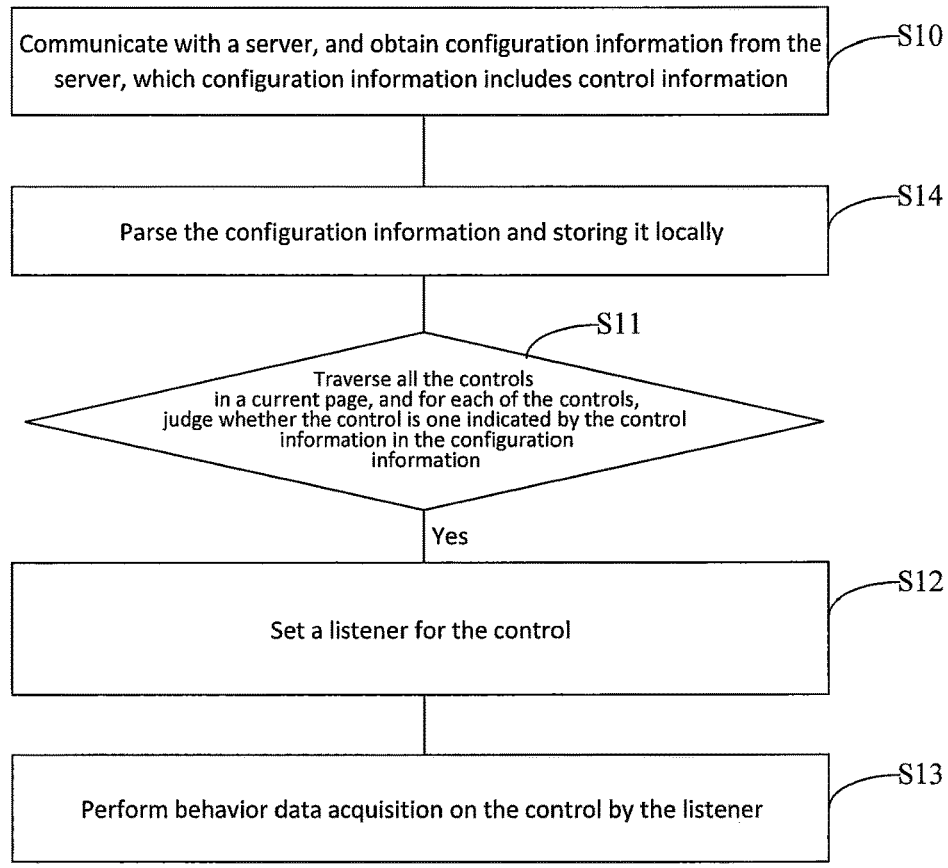
FIG. 2 is a flow diagram 2 of a page data acquisition method provided by the disclosure.

In an embodiment, as shown in FIG. 2, after S10 and before S11, the method further includes:

S14, parsing the configuration information and storing it locally.

That is, after the configuration information is parsed, it is stored in the terminal device.

In an embodiment, the control information includes a control ID, and further, may also include an associated control ID.

When a control ID is included the configuration information, if the ID of a control is consistent with the control ID in the configuration information, the control is one indicated by the control information in the configuration information.

When an associated control ID is further included in the configuration information, there will be a situation in which a certain control is associated with another control. For example, it may be such that one button control is associated with an edit box control, and based on this, it may be possible to perform click behavior acquisition on the button control and acquire the content inputted into the edit box. In an embodiment of the disclosure, by the server issuing the configuration information, the terminal dynamically monitors a control event. When the control information in the configuration information issued by the server includes an associated control ID, the event may be made to carry other control behavior data information.

Figure 3:
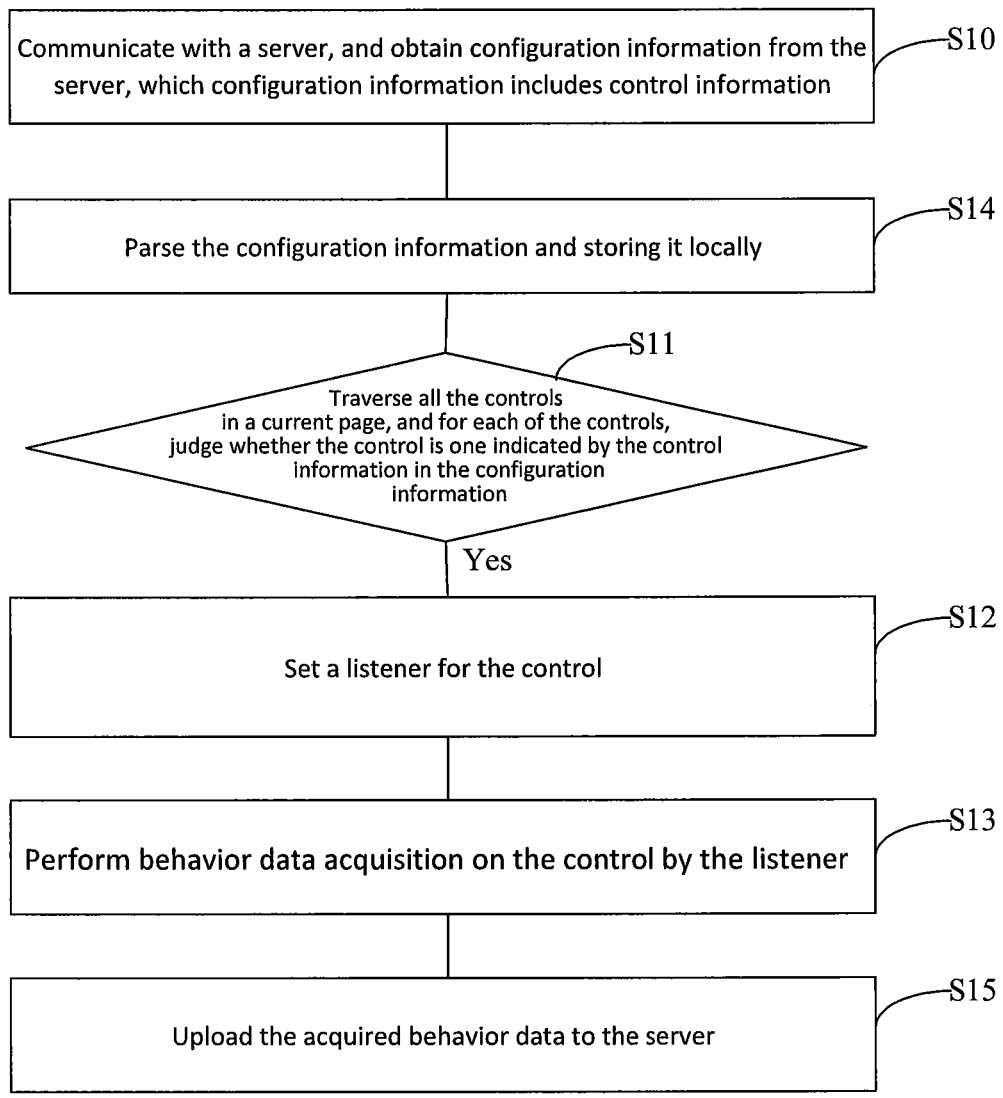
FIG. 3 is a flow diagram 3 of a page data acquisition method provided by the disclosure.

In an embodiment, as shown in FIG. 3, the method further includes: S15, uploading the acquired behavior data to the server.

The terminal device uploads the acquired behavior data to the server, and after the server stores it, subsequent analysis and processing may be performed.

Figure 4:
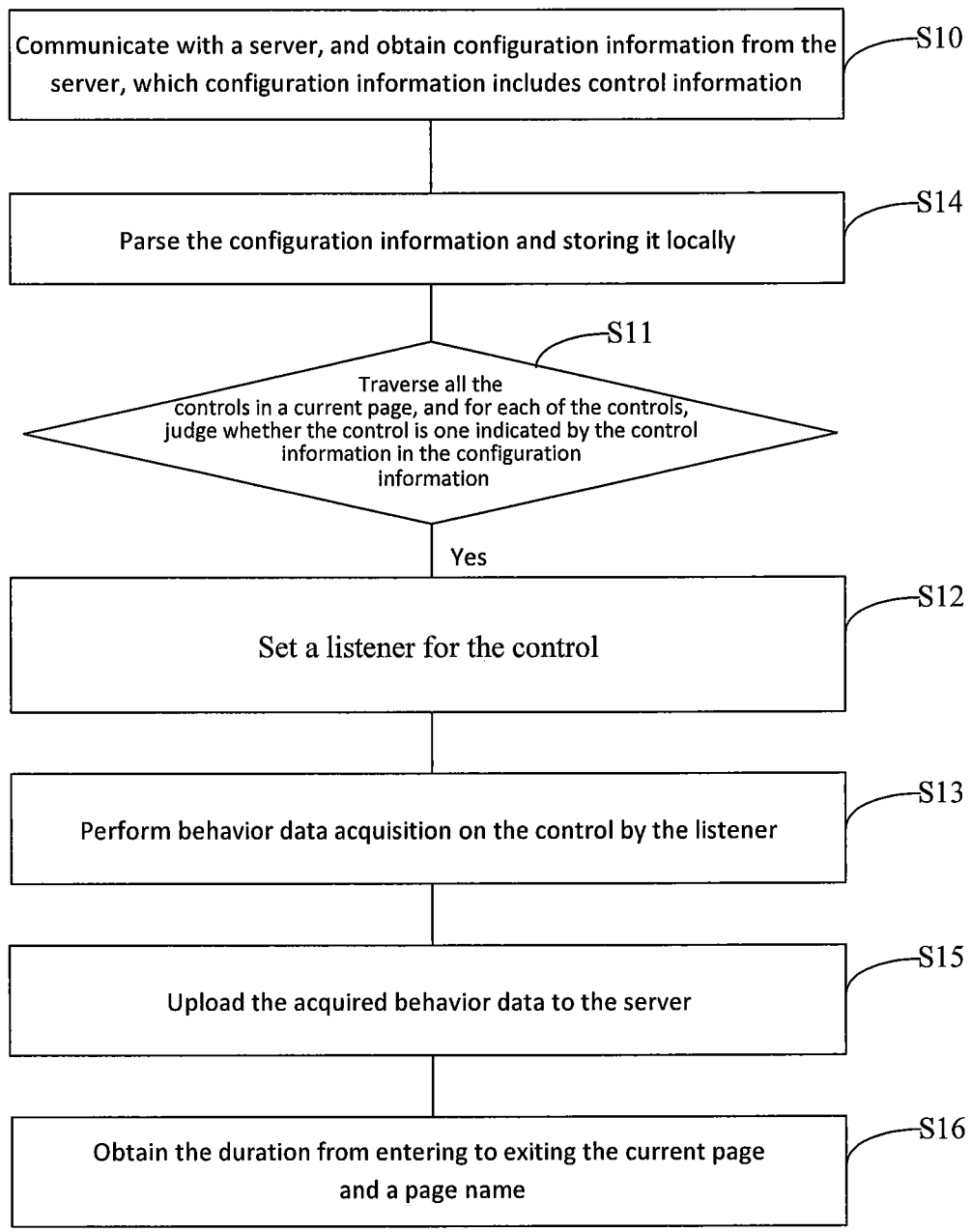
FIG. 4 is a flow diagram 4 of a page data acquisition method provided by the disclosure.

In an embodiment, the configuration information further includes page information; and based on this, as shown in FIG. 4, the method further includes: S16, obtaining the duration from entering to exiting the current page and a page name, so as to be able to perform more in-depth analysis on the user behavior.

Figure 5:
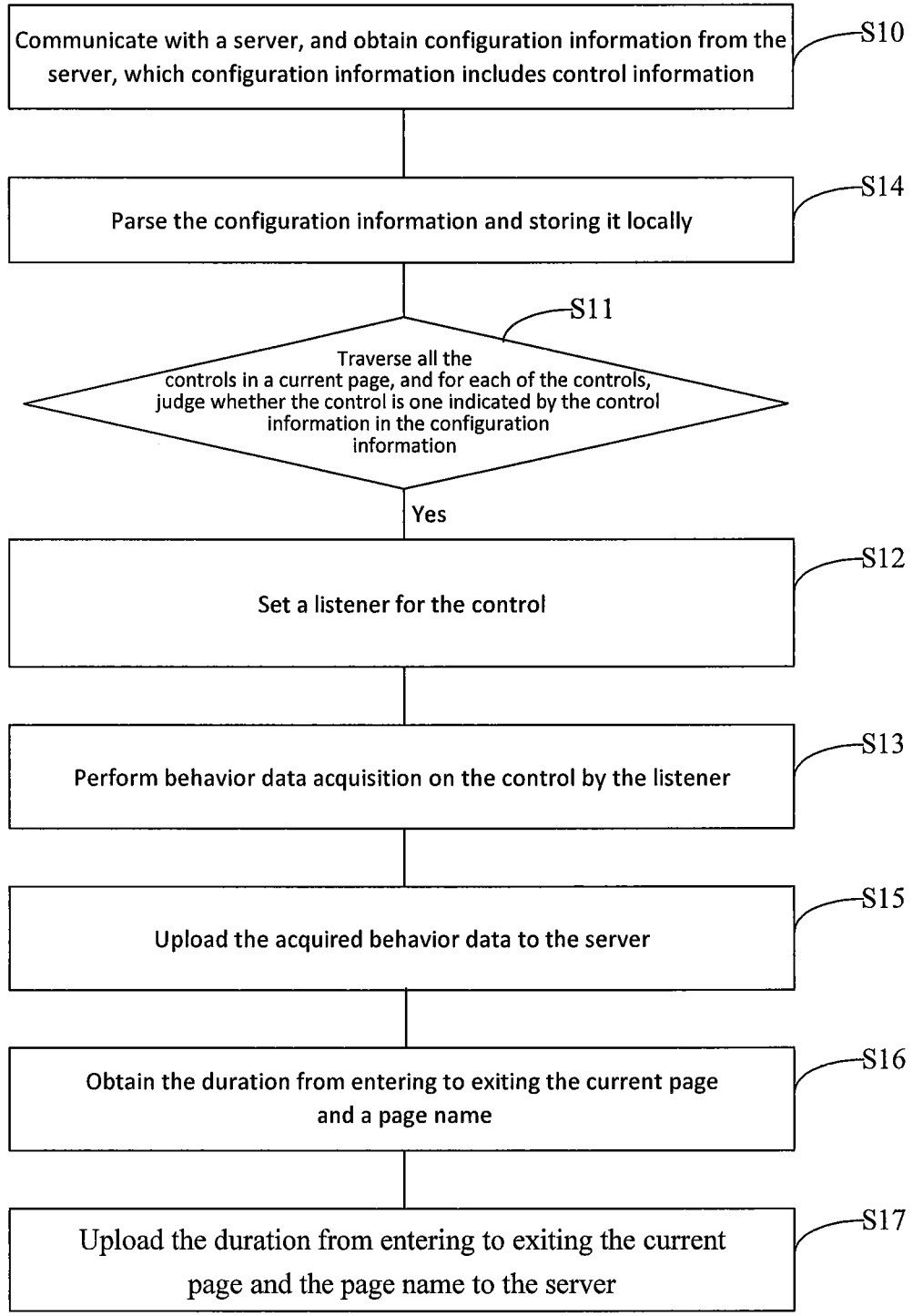
FIG. 5 is a flow diagram 5 of a page data acquisition method provided by the disclosure.

On this basis, as shown in FIG. 5, the method further includes: S17, uploading the duration from entering to exiting the current page and the page name to the server.

Further, the obtaining the duration from entering to exiting the current page and a page name includes: obtaining the time to enter the current page and the page name.

Figure 6:
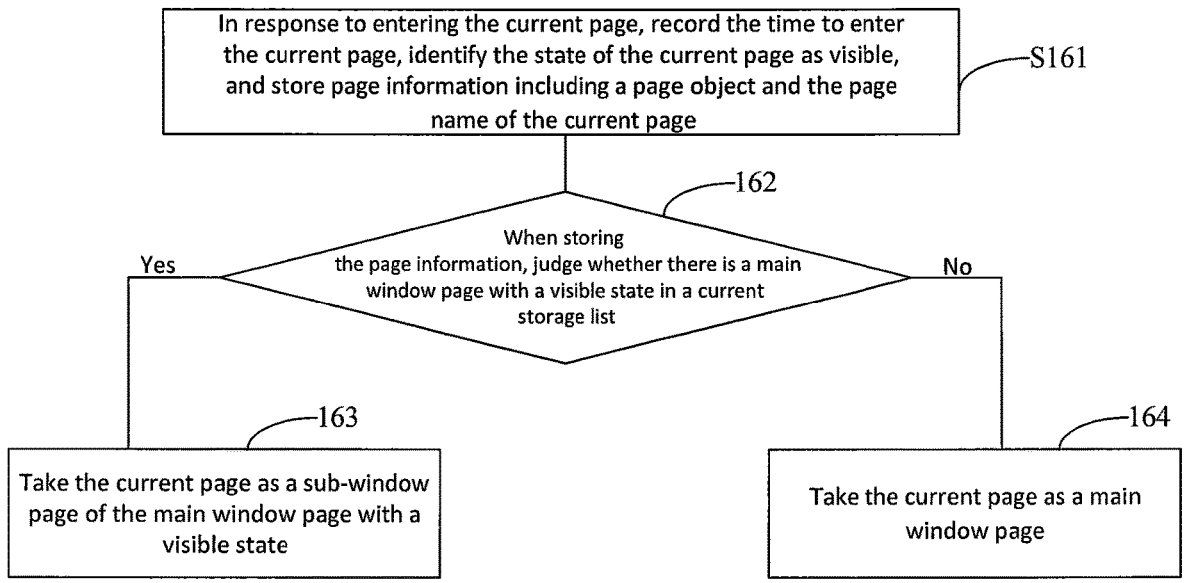
FIG. 6 is a flow diagram of a method for obtaining the time to enter a current page and a page name provided by the disclosure.

Therein, the obtaining the time to enter the current page and the page name, as shown in FIG. 6, includes the following steps.

S161, in response to entering the current page, the time to enter the current page is recorded, the state of the current page is identified as visible, and page information including a page object and the page name of the current page is stored.

Exemplarily, the page information may be stored in a list. A page is divided into a main window page and a sub-window page affiliated to the main window. For example, under a certain Activity (an active page), there may exist multiple Fragments (part of the page), wherein the Activity is a main window, and a Fragment is a sub-window. When entering the Activity or a Fragment, the class name of the Activity or the Fragment may be stored as a page name, and the current time is recorded. By taking the class name of the Activity or the Fragment as a page name, statistics on the Activity and the Fragment is implemented.

S162, when storing the page information, it is judged whether there is a main window page with a visible state in a current storage list; if yes, S163 is performed; otherwise, S164 is performed.

S163, the current page is taken as a sub-window page of the main window page with a visible state.

S164, the current page is taken as a main window page.

Figure 7:
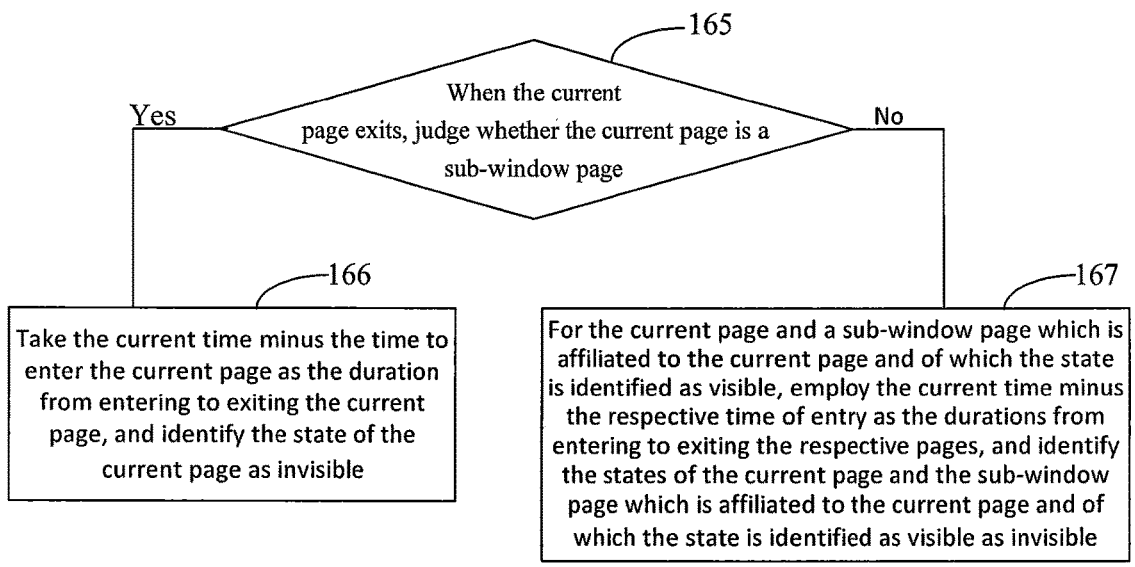
FIG. 7 is a flow diagram of a method for obtaining the duration from entering to exiting the current page provided by the disclosure.

On this basis, the obtaining the duration from entering to exiting the current page, as shown in FIG. 7, includes the following steps.

S165, when the current page exits, it is judged whether the current page is a sub-window page; if yes, S166 is performed; otherwise, S167 is performed.

It may be understood that, if the current page is not a sub-window page, it is necessarily a main window page.

S166, the current time minus the time to enter the current page is taken as the duration from entering to exiting the current page, and the state of the current page is identified as invisible.

S167, for the current page and a sub-window page which is affiliated to the current page and of which the state is identified as visible, the current time minus the respective time of entry is employed as the durations from entering to exiting the respective pages, and the states of the current page and the sub-window page which is affiliated to the current page and of which the state is identified as visible are identified as invisible.

Figure 8:
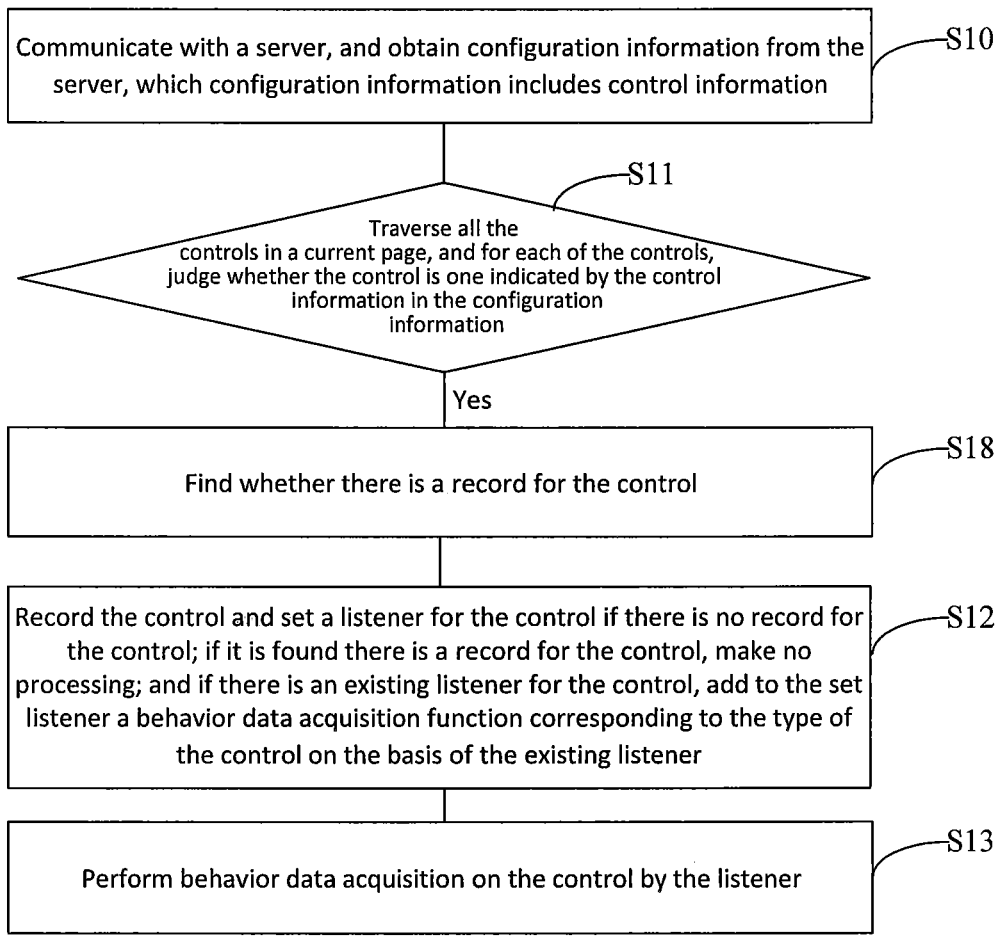
FIG. 8 is a flow diagram 6 of a page data acquisition method provided by the disclosure.

In an embodiment, as shown in FIG. 8, after it is judged that the control is one indicated by the control information in the configuration information, before setting a listener for the control, the method further includes: S18, finding whether there is a record for the control.

On this basis, the setting a listener for the control includes: if there is no record for the control, recording the control, and setting a listener for the control; if there is an existing listener for the control, replacing the existing listener with a new listener, which new listener is added a behavior data acquisition function corresponding to the type of the control on the existing listener, and if there is no listener for the control, setting a listener for the control, which listener obviously has the behavior data acquisition function corresponding to the type of the control; and if it is found that there is a record for the control, making no processing, that is, continuing to use the original listener.

Exemplarily, still taking the Android system as an example, when traversing all the controls in a page, if the ID of a certain control is the same as a control ID included in the configuration information, the control is one for which data acquisition needs to be performed. It may first be found whether there is a record for the control, and if there is no record for the control, the control is recorded, for example, recorded in a HashMap (Hash table), wherein a key may be an ID and a Value is a control itself, and the data acquisition function is added in the listen corresponding to the control. If it is found that there is a record for the control, no processing is performed, that is, the original listener continues to be used. Therein, if the control is recorded in the HashMap, then at the time of finding, the finding should also be performed in the HashMap.

In the embodiments of the disclosure, a control for which a listener is set is recorded, and before a listener needs to be set for a certain control, it is first found whether there is a record for the control, and if yes, there may be no need to set a new control again, which may avoid repetition.

Based on the forgoing, in an embodiment, the listener is set for the control by means of reflection and dynamic proxy.

In particular, a dynamic proxy is used to create a new listener, however, when creating the new listener, a parameter is needed, namely, the original listener, which original listener needs to be obtained using a reflection mechanism.

Exemplarily, with a button control as an example, an object obj1 with a fieldId of mListenerInfo may first be obtained using the reflection approach, then an object obj2 with a fielded of mOnClickListener of obj1 is obtained, an object obj3 of InvocationHandler is constructed using obj2, a proxy object of the original monitor is created using Proxy.newProxyInstance, and finally, the member mOnClickListener of mListenerInfo is set for the new proxy object by means of reflection, which realizes that a new monitor is used to replace the original monitor, and invocation of obj2 of the original monitor is kept in obj3 in addition to adding a new event processing logic, thereby implementing acquisition of a click event on the basis of the original functions.

Figure 9:
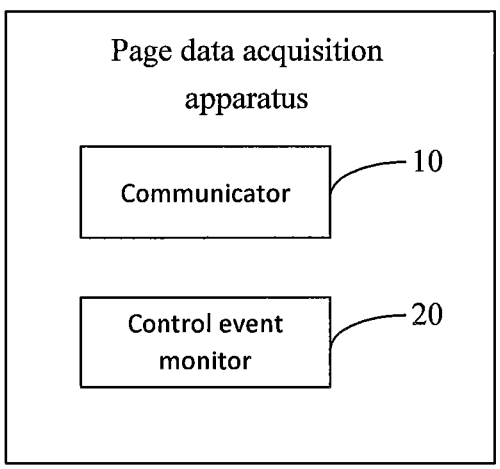
FIG. 9 is a structure diagram 1 of a page data acquisition apparatus provided by the disclosure.

An embodiment of the disclosure further provides a page data acquisition apparatus, as shown in FIG. 9, including: a communicator 10 and a control event monitor 20.

Therein, the control information may include a control ID and an associated control ID.

The control event monitor 20 is configured to traverse all the controls in a current page, and for each of the controls, judge whether the control is one indicated by the control information in the configuration information, and if yes, set a new listener for the control, which new listener is the original listener with a behavior data acquisition function corresponding to the type of the control added thereon.

Therein, all the controls in the current page may be traversed in a recursive manner.

With the Android system as an example, traversing all the controls in the current page may be to parse a view tree of the page and traverse all the views starting from DecorView in the views. The number of child nodes may be obtained by a function getChildCount( ), then a view of a child node is obtained by a function getChildAt( ) and all the views of the page may be traversed in a recursive manner. Therein, it should be appreciated by the person having skills in the art that the control is a specific class of view. On this basis, if the information of a certain control is consistent with the control information in the configuration information, a listener is set for the control.

It may be understood that the control information included by the configuration information in the server shall be information of a control on which behavior data acquisition needs to be performed.

It needs to be noted that, if a certain control is one indicated by the control information in the configuration information, a listener is set for the control, which is essentially to create a new listener to replace the existing listener and add in the new listener a behavior data acquisition function corresponding to the type of the control, of which the code will be preset in a program in advance. In addition to acquiring behavior data, the actions with which the new listener responds to an event will invoke an event response function of the original listener to accomplish the original functional logic of the control.

Therein, the listener may be set for the control by means of reflection and dynamic proxy. In particular, a dynamic proxy is used to create a new listener, however, when creating the new listener, a parameter is needed, namely, the original listener, which original listener needs to be obtained using a reflection mechanism.

The behavior data acquisition function should be determined according to the type of the control. For example, for a button control, what is acquired is click behavior data; and for a selection box control, selection behavior data may be acquired, or click behavior data may also be acquired. When multiple kinds of behavior data may be acquired for a control, it is necessary to determine which kind of behavior data is to be acquired at the time of developing the program, and thus preset code knows what type of listener to use to replace the original listener (that is, which behavior data acquisition function is added). Once the acquisition action is defined, the acquisition function will be determined when a behavior takes place.

The embodiment of the disclosure provides a page data acquisition apparatus. By storing configuration information including control information in a server, wherein the control indicated by the control information is one on which it is necessary to perform behavior data acquisition, it may be possible, after a terminal device obtains the configuration information through a communicator 10 and when a user is browsing a current page, to set a listener only for the control indicated in the configuration information by a control event monitor 20, wherein the new listener is added a behavior data acquisition function corresponding to the type of the control on the basis of the original listener, thereby implementing acquisition of behavior data. Based on this, since the behavior data acquisition-function will be preset in a program in advance, and add it when a listener is set for a control, as compared to the buried point manner (i.e., in which code is written in an event processing function) employed in the reference, the disclosure does not need to add code when each control event is processed, which may reduce the complexity of the development process.

Figure 10:
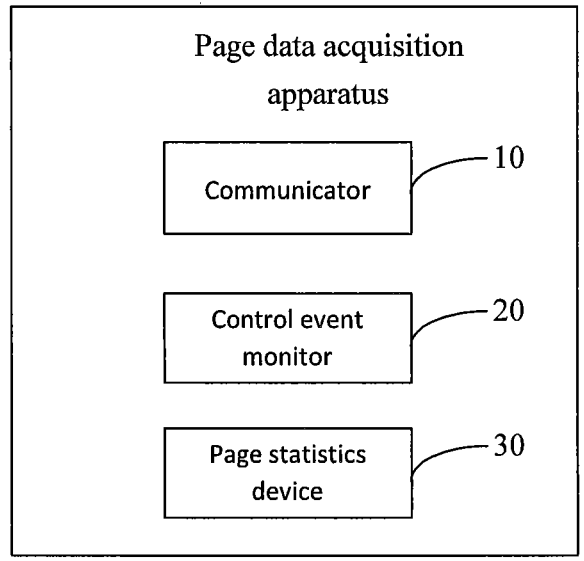
FIG. 10 is a structure diagram 2 of a page data acquisition apparatus provided by the disclosure.

In an embodiment, the configuration information further includes page information, and based on this, as shown in FIG. 10, the page data acquisition apparatus further includes a page statistics device 30 configured to obtain the duration from entering to exiting the current page and a page name, so as to be able to perform more in-depth analysis on user behaviors.

On this basis, the page statistics device 30 obtaining the duration from entering to exiting the current page and a page name includes: the page statistics device 30 obtaining the time to enter the current page and the page name.

Therein, the page statistics device 30 obtaining the time to enter the current page and the page name includes: in response to entering the current page, recording the time to enter the current page, identifying the state of the current page as visible, and storing page information including a page object and the page name of the current page; when storing the page information, judging whether there is a main window page with a visible state in a current storage list, and if yes, taking the current page as a sub-window page of the main window page with a visible state, otherwise, taking the current page as a main window page.

Exemplarily, the page information may be stored in a list. A page is divided into a main window page and a sub-window page affiliated to the main window. For example, under a certain Activity, there may exist multiple Fragments, wherein the Activity is a main window, and a Fragment is a sub-window.

When entering the Activity or a Fragment, the class name of the Activity or the Fragment may be stored as a page name, and the current time is recorded. By taking the class name of the Activity or the Fragment as a page name, statistics on the Activity and the Fragment is implemented.

On this basis, after obtaining the time to enter the current page and the page name, the page statistics device 30 further obtains the duration from entering to exiting the current page.

Therein, the page statistics device 30 obtaining the duration from entering to exiting the current page includes: when the current page exits, judging whether the current page is a sub-window page; if yes, taking the current time minus the time to enter the current page as the duration from entering to exiting the current page, and identifying the state of the current page as invisible; and if no, for the current page and a sub-window page which is affiliated to the current page and of which the state is identified as visible, employing the current time minus the respective time of entry as the durations from entering to exiting the respective pages, and identifying the states of the current page and the sub-window page which is affiliated to the current page and of which the state is identified as visible as invisible.

In an embodiment, the control event monitor 20 is configured to, after judging that the control is one indicated by the control information in the configuration information, before setting a listener for the control, further find whether there is a record for the control; if there is no record for the control, record the control, and set a listener for the control; if there is an existing listener for the control, replace the existing listener with a new listener, wherein the new listener is added a behavior data acquisition function corresponding to the type of the control on the existing listener; and if there is no listener for the control, set a listener for the control, which listener obviously has the behavior data acquisition function corresponding to the type of the control; and if it is found that there is a record for the control, make no processing, that is, continue to use the original listener.

Exemplarily, still taking the Android system as an example, when traversing all the controls in a page, if the ID of a certain control is the same as a control ID included in the configuration information, the control is one for which data acquisition needs to be performed. It may first be found whether there is a record for the control, and if there is no record for the control, the control is recorded, for example, recorded in a HashMap, wherein a key may be an ID and a Value is a control itself, and the data acquisition function is added in the listen corresponding to the control. If it is found that there is a record for the control, no processing is performed, that is, the original listener continues to be used. Therein, if the control is recorded in the HashMap, then at the time of finding, the finding should also be performed in the HashMap.

In the embodiments of the disclosure, a control for which a listener is set is recorded, and before a listener needs to be set for a certain control, it is first found whether there is a record for the control, and if yes, there may be no need to set a new control again, which may avoid repetition.

Figure 11:
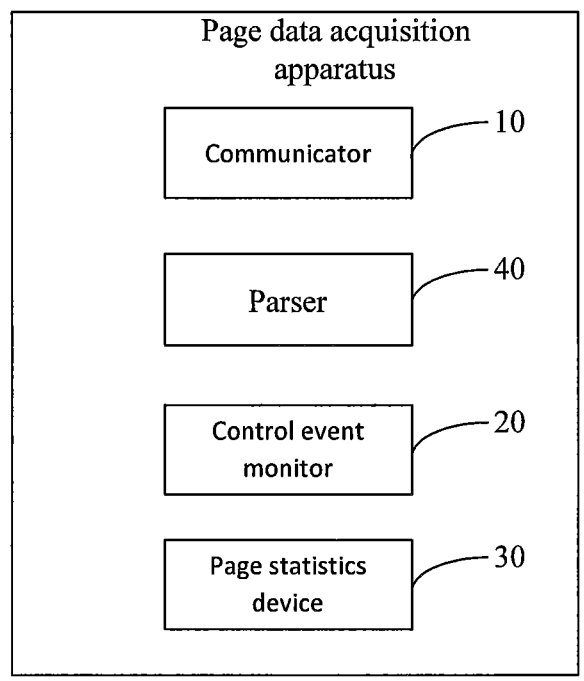
FIG. 11 is a structure diagram 3 of a page data acquisition apparatus provided by the disclosure.

In an embodiment, as shown in FIG. 11, the page data acquisition apparatus further includes a parser 40 configured to parse the configuration information obtained from the server and store it locally. That is, after the configuration information is parsed, it is stored in a terminal device.

In an embodiment, the communicator 10 is further configured to upload at least the acquired behavior data to the server. After the communicator 10 uploading the acquired behavior data to the server and the server storing it, subsequent analysis and processing may be performed.

Further, the communicator 10 may further upload the duration from entering to exiting the current page and the page name to the server.

Figure 12:
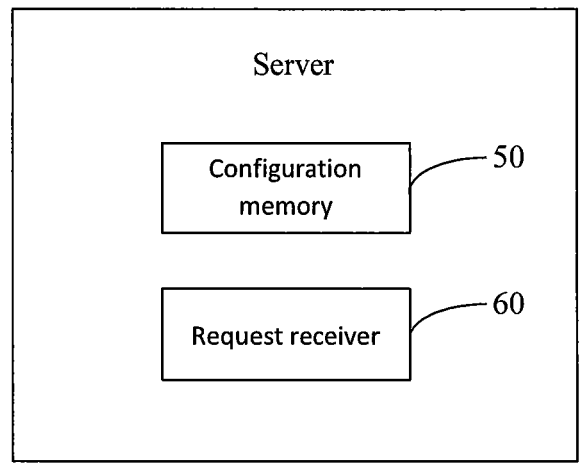
FIG. 12 is a structure diagram 1 of a server provided by the disclosure.

An embodiment of the disclosure further provides a server, as shown in FIG. 12, including: a configuration memory 50 and a request receiver 60.

The configuration memory 50 is configured to store configuration information, which configuration information includes control information.

Therein, the configuration information is stored in the form of an xml file or a json format data or the like.

The control information includes a control ID, and further, may also include an associated control ID.

When a control ID is included the configuration information, if the ID of a control is consistent with the control ID in the configuration information, the control is one indicated by the control information in the configuration information.

When an associated control ID is further included in the configuration information, there will be a situation in which a certain control is associated with another control. For example, it may be such that one button control is associated with an edit box control, and based on this, it may be possible to perform click behavior acquisition on the button control and acquire the content inputted into the edit box. In an embodiment of the disclosure, by the server issuing the configuration information, a terminal dynamically monitors a control event. When the control information in the configuration information issued by the server includes an associated control ID, the event may be made to carry other control behavior data information.

The request receiver 60 sends the configuration information to a page data acquisition apparatus when receiving a request for obtaining the configuration information sent by the page data acquisition apparatus.

Based on this, after a terminal device obtains the configuration information and when a user is browsing a current page, a new listener is set only for the control indicated in the configuration information, wherein the new listener is added a behavior data acquisition function corresponding to the type of the control on the basis of the original listener, thereby implementing acquisition of behavior data. Since the behavior data acquisition function will be preset in a program in advance, and add it when a listener is set for a control, as compared to the buried point manner (i.e., in which code is written in an event processing function) employed in the reference, the disclosure does not need to add code when each control event is processed, which may reduce the complexity of the development process.

Figure 13:
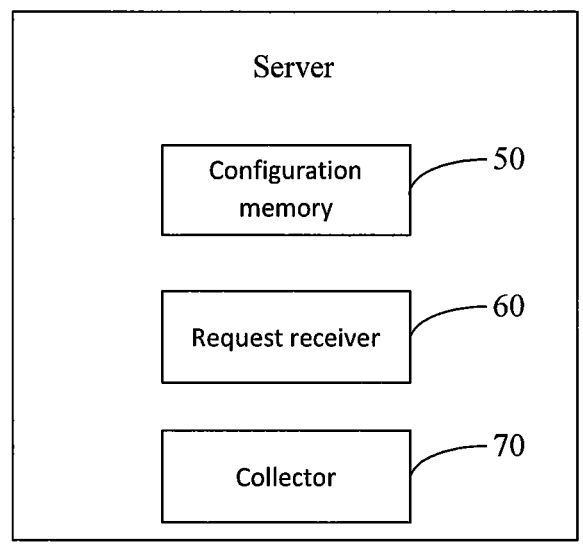
FIG. 13 is a structure diagram 2 of a server provided by the disclosure.

In an embodiment, as shown in FIG. 13, the server further includes a collector 70 configured to store and analyze behavior data uploaded by the page data acquisition apparatus. After the acquired behavior data is uploaded to the server and the server stores it, subsequent analysis and processing may be performed.

In a case in which the configuration information further includes page information, the collector 70 is further configured to store and analyze the duration from entering to exiting a current page and a page name uploaded by the page data acquisition apparatus, so as to be able to perform more in-depth analysis on the user behavior.

An embodiment of the disclosure further includes an electronic device including a processor and a memory which is used for storing one or more program; and when executed by the processor, the one or more program implements the page data acquisition method as described above.

An embodiment of the disclosure further includes a computer readable medium storing thereon a computer program which, when executed, implements the page data acquisition method as described above.

It may be appreciated by the person having ordinary skills in the art that all or part of the steps of the above method embodiment may be accomplished by program instruction related hardware, the program may be stored in a computer readable storage medium, and the program performs the steps of the above method embodiment when executed; and the storage medium mentioned above comprises: various media which may store a program code, such as ROM, RAM, a magnetic disk or a compact disc, etc.

It may be understood by the person having ordinary skills in the art that, the order in which the steps of the method in the embodiments of the disclosure are shown does not represent the order in which the steps are performed, and the shown steps of the method may be performed in any reasonable order, including being performed successively and simultaneously in various possible orders.

What are described above are just specific embodiments of the invention, however, the protection scope of the invention is not limited thereto, and variations or alternatives easily occurring to any artisan familiar with the technical field within the technical scope disclosed by the invention should be encompassed within the protection scope of the invention. Therefore, the protection scope of the invention should be subject to the protection scope of the claims.

The invention claimed is:

1. A page data acquisition method for an electronic device comprising a processor, the method, performed by the processor, comprising:

communicating with a server wirelessly or wiredly, and obtaining configuration information from the server, wherein the configuration information comprises control information, and the control information comprises at least a control ID;

traversing controls in a current page, and for a control of the controls, judging whether the control is one indicated by the control information in the configuration information;

setting a listener for the control in response to the control being the one indicated by the control information in the configuration information; and performing behavior data acquisition on the control, wherein after judging that the control is the one indicated by the control information in the configuration information, and before the setting the listener for the control, finding whether there is a record for the control using the control ID in a HashMap which comprises at least a control ID as respective keys, and at least a corresponding control as respective values of the HashMap;

in response to determining that there is not the record for the control in the HashMap, performing operations comprising:

recording the control in the HashMap;

determining whether there is an existing listener for the control;

in response to determining that there is the existing listener for the control, replacing the existing listener with a new listener, wherein a behavior data acquisition function corresponding to a type of the control on the existing listener is added to the new listener; and in response to determining that there is not the existing listener for the control, setting a listener for the control, wherein the listener has the behavior data acquisition function corresponding to the type of the control; and in response to determining that there is the record for the control in the HashMap, continuing to use the existing listener.

2. The method as claimed in claim 1, wherein the listener is set for the control based on reflection and dynamic proxy.

3. The method as claimed in claim 1, wherein after obtaining the configuration information from the server, and before traversing the controls in the current page, the method further comprises:

parsing the configuration information; and storing the configuration information locally.

4. The method as claimed in claim 1, wherein the configuration information further comprises page information, and wherein the method further comprises:

obtaining a duration from entering to exiting the current page and a page name.

5. The method as claimed in claim 4, wherein the obtaining the duration from entering to exiting the current page and page name comprises:

obtaining a time to enter the current page and the page name, wherein the obtaining the time to enter the current page and the page name comprises:

in response to entering the current page, recording the time to enter the current page, identifying a state of the current page as visible, and storing the page information comprising a page object and the page name of the current page; and when storing the page information, judging whether there is a main window page with a visible state in a current storage list;

in response to the main window page with the visible state being in the current storage list, taking the current page as a sub-window page of the main window page with the visible state; and in response to the main window page with the visible state not being in the current storage list, taking the current page as the main window page.

6. The method as claimed in claim 5, wherein after obtaining the time to enter the current page and the page name, the method further comprises:

in response to exiting the current page, judging whether the current page is a sub-window page;

in response to the current page being a sub-window page, taking a current time minus the time to enter the current page as the duration from entering to exiting the current page, and identifying the state of the current page as invisible; and in response to the current page not being a sub-window page, for the current page and a sub-window page which is affiliated to the current page and of which the state is identified as visible, employing the current time minus a respective time of entry as respective durations from entering to exiting respective pages, and identifying respective states of the current page and the sub-window page which is affiliated to the current page and of which the state is previously identified as visible as invisible.

7. The method as claimed in claim 1, wherein the method further comprises:

uploading at least an acquired behavior data to the server.

8. An electronic device comprising a processor and a memory, wherein the memory is configured to store one or more programs, and wherein when executed by the processor, the one or more programs implement a method comprising:

communicating with a server wirelessly or wiredly, and obtaining configuration information from the server, wherein the configuration information comprises control information, and the control information comprises at least a control ID;

traversing controls in a current page, and for a control of the controls, judging whether the control is one indicated by the control information in the configuration information;

setting a listener for the control in response to the control being the one indicated by the control information in the configuration information; and performing behavior data acquisition on the control, wherein after judging that the control is the one indicated by the control information in the configuration information, and before the setting the listener for the control, finding whether there is a record for the control using the control ID in a HashMap which comprises at least a control ID as respective keys, and at least a corresponding control as respective values of the HashMap;

in response to determining that there is not the record for the control in the HashMap, performing operations comprising:

recording the control in the HashMap;

determining whether there is an existing listener for the control;

in response to determining that there is the existing listener for the control, replacing the existing listener with a new listener, wherein a behavior data acquisition function corresponding to a type of the control on the existing listener is added to the new listener; and in response to determining that there is not the existing listener for the control, setting a listener for the control, wherein the listener has the behavior data acquisition function corresponding to the type of the control; and in response to determining that there is the record for the control in the HashMap, continuing to use the existing listener.

9. The electronic device as claimed in claim 8, wherein the listener is set for the control based on reflection and dynamic proxy.

10. The electronic device as claimed in claim 8, wherein after obtaining the configuration information from the server, and before traversing the controls in the current page, the method further comprises:

parsing the configuration information; and
storing the configuration information locally.

11. The electronic device as claimed in claim 8, wherein the configuration information further comprises page information, and wherein the method further comprises:

obtaining a duration from entering to exiting the current page and a page name.

12. The electronic device as claimed in claim 11, wherein the obtaining the duration from entering to exiting the current page and page name comprises:

obtaining a time to enter the current page and the page name, wherein the obtaining the time to enter the current page and the page name comprises:

in response to entering the current page, recording the time to enter the current page, identifying a state of the current page as visible, and storing the page information comprising a page object and the page name of the current page; and when storing the page information, judging whether there is a main window page with a visible state in a current storage list;

in response to the main window page with the visible state being in the current storage list, taking the current page as a sub-window page of the main window page with the visible state; and in response to the main window page with the visible state not being in the current storage list, taking the current page as the main window page.

13. The electronic device as claimed in claim 12, wherein after obtaining the time to enter the current page and the page name, the method further comprises:

in response to exiting the current page, judging whether the current page is a sub-window page;

in response to the current page being a sub-window page, taking a current time minus the time to enter the current page as the duration from entering to exiting the current page, and identifying the state of the current page as invisible; and in response to the current page not being a sub-window page, for the current page and a sub-window page which is affiliated to the current page and of which the state is identified as visible, employing the current time minus a respective time of entry as respective durations from entering to exiting respective pages, and identifying respective states of the current page and the sub-window page which is affiliated to the current page and of which the state is previously identified as visible as invisible.

14. The electronic device as claimed in claim 8, wherein the method further comprises:

uploading at least an acquired behavior data to the server.

15. A non-transitory computer readable medium storing thereon a computer program which, when executed, implements a method comprising:

communicating with a server wirelessly or wiredly, and obtaining configuration information from the server, wherein the configuration information comprises control information, and the control information comprises at least a control ID;

traversing controls in a current page, and for a control of the controls, judging whether the control is one indicated by the control information in the configuration information;

setting a listener for the control in response to the control being the one indicated by the control information in the configuration information; and performing behavior data acquisition on the control, wherein after judging that the control is the one indicated by the control information in the configuration information, and before the setting the listener for the control, finding whether there is a record for the control using the control ID in a HashMap which comprises at least a control ID as respective keys, and at least a corresponding control as respective values of the Hash-Map;

in response to determining that there is not the record for the control, performing operations comprising:

recording the control in the HashMap;
determining whether there is an existing listener for the control;

in response to determining that there is the existing listener for the control, replacing the existing listener with a new listener, wherein a behavior data acquisition function corresponding to a type of the control on the existing listener is added to the new listener; and in response to determining that there is not the existing listener for the control, setting a listener for the control, wherein the listener has the behavior data acquisition function corresponding to the type of the control; and in response to determining that there is the record for the control in the HashMap, continuing to use the existing listener.

* * * * *